United States Patent [19]

Brogardh et al.

[11] 4,313,344
[45] Feb. 2, 1982

[54] FIBER OPTICAL TEMPERATURE MEASUREMENT DEVICES

[75] Inventors: Torgny Brogardh; Lars Sander, both of Vesteras, Sweden

[73] Assignee: Asea Aktiebolag, Vesteras, Sweden

[21] Appl. No.: 98,844

[22] Filed: Nov. 30, 1979

[30] Foreign Application Priority Data

Dec. 5, 1978 [SE] Sweden ................................ 7812480

[51] Int. Cl.³ .............................................. G01J 5/28
[52] U.S. Cl. ................................................ 73/355 R
[58] Field of Search ....................... 73/355 R, 355 EM; 250/338; 356/43, 44, 46–48

[56] References Cited

U.S. PATENT DOCUMENTS 3,057,200 10/1962 Wood .
3,462,224 8/1969 Woods et al. ............. 73/355 EM X
3,698,813 10/1972 Aisenberg .................. 73/355 EM X
3,745,830 7/1973 Smith ......................... 73/355 EM X
4,016,761 4/1977 Rozzell et al. .

Primary Examiner—James J. Gill
Attorney, Agent, or Firm—Watson, Cole, Grindle & Watson

[57] ABSTRACT

The invention relates to a fiber optical temperature measuring device of the pyrometer type, comprising a transducer section and an electronic section, which are mutually interconnected by at least one optical fiber. The electronic section includes at least one light source and the light therefrom is arranged to be emitted via the optical fiber to the transducer, and in the transducer at least part of the light is reflected back into the fiber and is conducted through the optical fiber together with an output measuring signal from the transducer to one or more detectors included in the electronic section.

15 Claims, 8 Drawing Figures

4,313,344

FIBER OPTICAL TEMPERATURE MEASUREMENT DEVICES

FIELD OF THE INVENTION

The present invention relates to fiber optical temperature measurement devices and more particularly to such measurement devices using pyrometer type transducers with a separate transducer section and a separate electronic section which are mutually interconnected by at least one optical fiber, the electronic section using at least one light source.

BACKGROUND

When using measuring devices of the above kind it is desirable to obtain a high accuracy of measurement despite known difficulties in the measurement environment. The problems arising in this connection are instability of the transmission member, and aging and temperature drift of components included in the measuring device.

SUMMARY OF THE INVENTION

The invention aims to provide a solution to the abovementioned problems and other problems associated therewith, and is characterized in that the light from the light source is adapted to be emitted via the optical fiber to the transducer and to be at least partially reflected therein and back into the optical fiber. The light is conducted in the optical fiber together with an output measuring signal from the transducer to one or more detectors included in the electronic section. A high accuracy is obtained thereby since the light from the light source in the electronic section is used as a reference signal, thus obtaining compensation for instabilities in the transmission members and detectors.

In a preferred embodiment of the invention, the composite signal from the transducer is divided into a measurement component, emanating from the radiation emitted from the transducer or the measured object—i.e. the measuring signal—as well as into one or more reference components emitted from the light source via the optical fiber. This division makes it possible to achieve a good accuracy of measurement, for example when measuring the temperature in a steel furnace or ladle.

BRIEF DESCRIPTION OF THE FIGURES

The invention is described in greater detail in the accompanying drawings, wherein.

DETAILED DESCRIPTION

Figure 1:
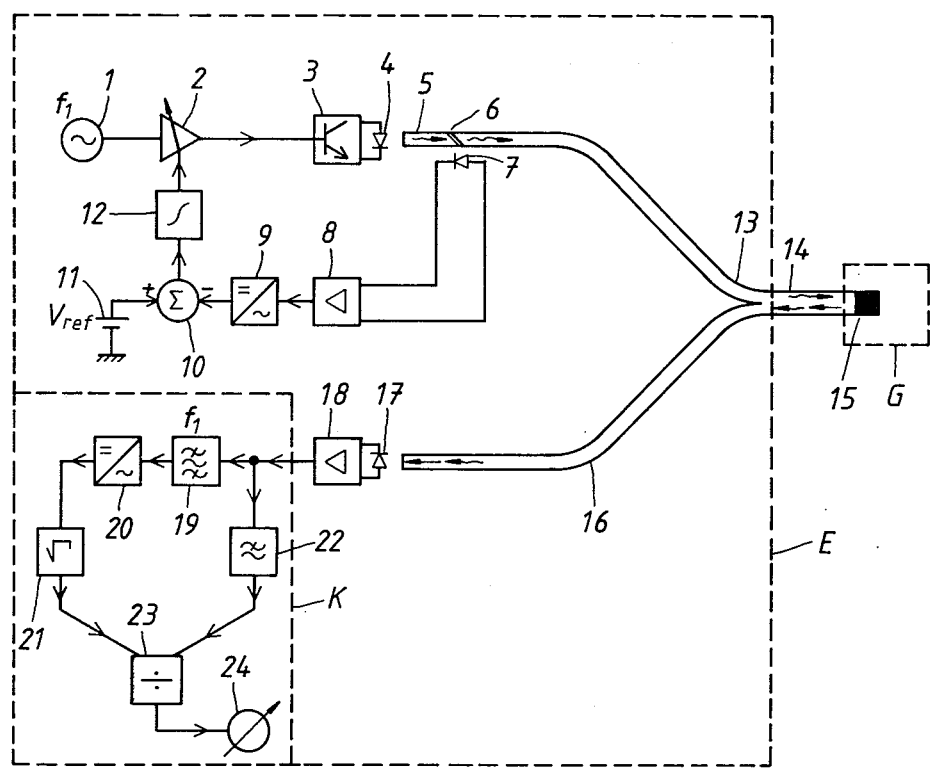
FIG. 1 shows a measuring device according to the invention having a separate transducer unit and a separate electronic unit.

FIG. 1 shows a measuring device according to the invention having automatic compensation for variations of the attenuation of the fiber optics in a fiber optical temperature measuring device operating according to well-known pyrometric principles. This automatic compensation provides a solution to the above-mentioned problems of instability, aging of components, and so on.

The output signal of frequency $f_1$ from oscillator 1 is passed via controllable amplifier 2 to drive circuit 3 of light source 4 (e.g., one or more light sources may be driven in this way), which may be a light-emitting diode (LED) or a semiconductor laser. The modulated light is switched to optical fiber 5, from which part of the light has been removed by light coupler 6 to photodetector 7, for example a photodiode or a phototransistor, the photocurrent of which is amplified in amplifier 8 and demodulated in demodulator 9. The demodulated signal is compared with reference signal 11 from a reference signal source in comparison device 10. The signals in comparison device 10 are DC voltages. The output signal from the difference former or comparison device 10 therefore constitutes an error signal for regulator 12, which controls controllable amplifier 2 in such a way that the amplitude of the modulated light from light source 4 is at all times held constantly independent of aging, instability, etc. The light which passes light coupler 6 in the direction of the point of measuring, is switched in optical fiber branch 13 into optical fiber 14, which is connected to measurement transducer 15, which in FIG. 1 consists of a black body radiating means. The transducer section is designated G and the electronic section is designated E in FIG. 1, and these sections may be located at a considerable distance from one another, so that electronic section E may be housed independently of the environmental conditions around transducer G. The heat radiation from black body 15, which is a measure of the temperature thereof, is emitted into optical fiber 14 and is conducted, together with the light from light source 4 and reflected against the black body and/or the end of optical fiber 14, through optical fiber 14 to optical fiber branch 13 and from there via optical fiber 16 to photodetector 17, which may be a photodiode, a phototransistor or a pyroelectric detector. The measuring signal of transducer G is thus the radiation from black body 15, and transducer G also emits reflected light from light source 4. The output signal of photodetector 17 is amplified in amplifier 18, and the amplified detector signal is divided by filters 19 and 22 into two components, emanating from light source 4 and black body radiating means 15, respectively. The output signal from filter 19, which is the reference signal emanating from light source 4, is demodulated in demodulating device 20 and is supplied to circuit 21 which forms the square root of the signal. In quotient-forming circuit 23, the quotient between the output signals from filter 22 and square root circuit 21 is obtained and supplied to registering or indicating instrument 24. Since output signal 22 is influenced to the same extent as the output signal from circuit 21 by variations in the optical fiber transmission channel 14 (through microbending, joints, etc.), the output signal from quotient-forming circuit 23 is compensated for these variations. The root extraction in circuit 21 is necessary since the light from light source 4 passes through optical fiber 14 twice (back and forth), whereas the radiation from black body 15, which is blocked by electric filter 19, but is passed by filter 22, only traverses through the optical fiber once. Alternatively, the signal from filter 22 may be squared, which, however, results in a square measuring scale, the circuit 21 then being omitted. This modification has not been shown in FIG. 1.

Figure 1A:
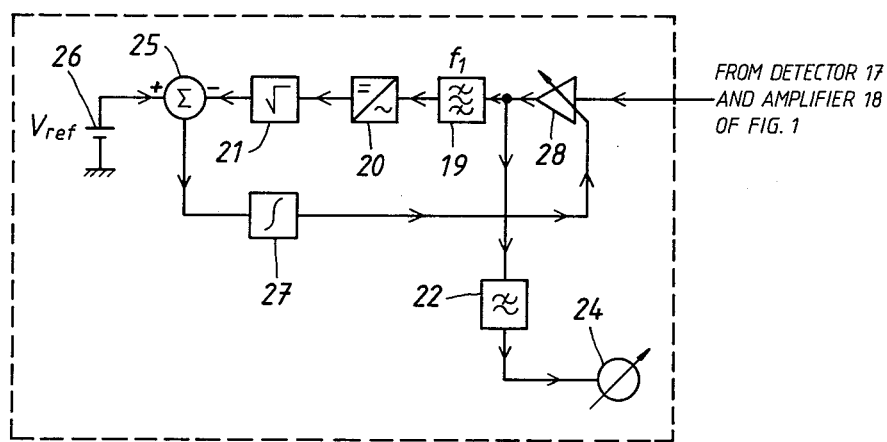
FIGS. 1a and 1b show respective modifications of the electronic unit.

Instead of quotient-forming electronic unit K in FIG. 1, a regulator circuit according to FIG. 1a may be used. The output signal from detector 17 and amplifier 18, which receives the signals from transducer G, passes through controllable amplifier 28 before division into the measuring component and reference component is made by filters 22 and 19, respectively. The component with modulation frequency $f_1$ is compared in comparison device 25, after root extraction in function generator 21, with reference voltage 26, and the error signal from comparison device 25 is supplied to regulator 27, which controls controllable amplifier 28. Compensation for variations in the transmission of optical fiber 14 is therefore continuously obtained, and the output signal from filter 22 may be used directly as a measuring signal to measuring instrument 24. Filter 22 blocks the reference signals, which are modulated with frequency $f_1$.

Figure 1B:
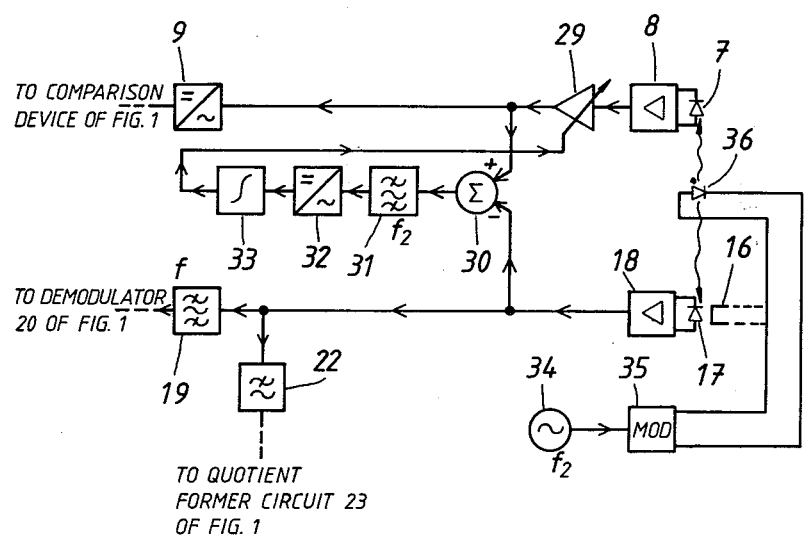

When there are great demands on accuracy, bad matching between photodetectors 7 and 17 of FIG. 1 may lead to unacceptable errors in measurement. One way of avoiding this is shown in FIG. 1b. Oscillator 34 modulates light source 36 via drive circuit 35. Light source 36, in a constant relation to modulating frequency $f_2$, which is separated from frequency $f_1$, impinges upon photodetectors 7 and 17. In difference-forming means 30, the output signal from controllable amplifier 29, connected to the output of detector amplifier 8, is compared with the output signal from detector amplifier 18. The difference signal thus obtained is filtered with respect to the signal from light source 36 in filter 31, is demodulated in demodulator 32 and supplied to regulator 33 which controls controllable amplifier 29 such that the output signal therefrom is maintained equal to the output signal from detector amplifier 18 with respect to the signal component modulated with frequency $f_2$. In this way, amplifier 29 is compensated for deviations in matching between photodetectors 7 and 17. Otherwise, the same electronic system is used as in the measuring device according to FIG. 1.

Separation of the measuring and reference components is performed in FIG. 1 by frequency multiplexing (the reference signal has frequency $f_1$ and the measuring signal $<f_1$) but may, of course, also be accomplished by time-multiplexing with a switched light source and holding circuits after the detector signals are generated.

If there are problems in maintaining the same set of modes in optical fiber 14 with respect to the light from light source 4 and black body 15, mode mixing may be performed in optical fiber 5, and/or diffusion filters may be placed in front of light source 4. Further, several light sources 4 with different modulating frequencies and different spectral distributions may be used to automatically calibrate optical fiber 14 when different wavelength ranges are used.

The measurement device according to FIG. 1 has a closed optical system. If a contact-free pyrometric temperature measurement is required, the end surface of optical fiber 14 may be antireflex-coated, so that the light from light source 4 is reflected against the measured object. This results in compensation for varying attenuation in the open optical system, for example through fouling, and it is even possible to obtain a certain compensation for a varying emission factor of the measured object.

Figure 2:
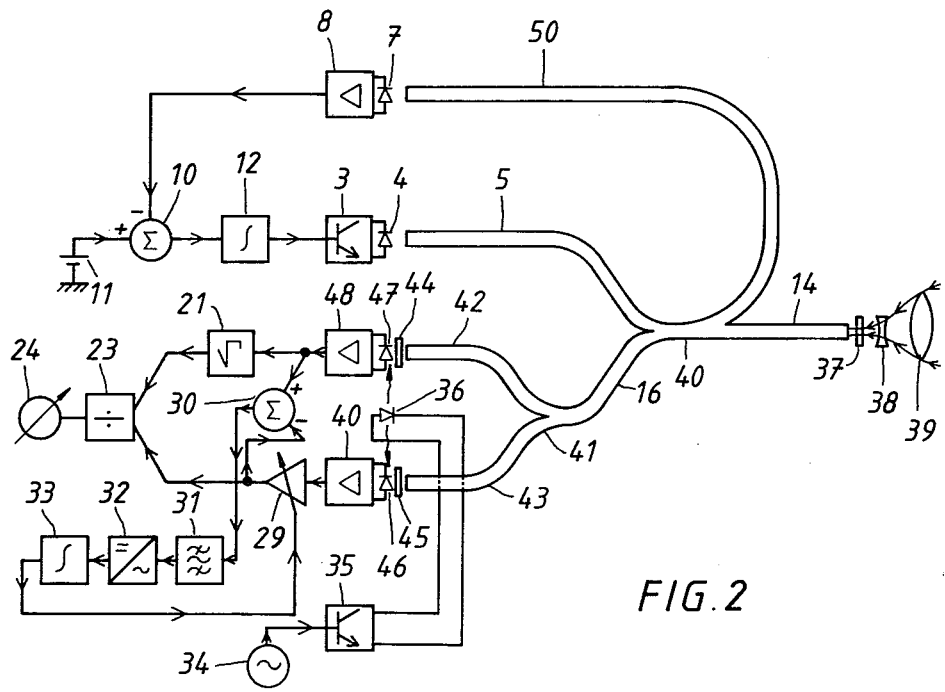
FIG. 2 shows a modified embodiment of the entire measuring device.

FIG. 2 shows an alternative arrangement for compensating the affects of varying light attenuation in the fiber optics of a fiber optical pyrometer. Light source 4 emits unmodulated light into optical fiber 5, and this light is maintained constant through the optical feedback via optical branch 40, optical fiber 50 (the feedback path), photodetector 7 and detector amplifier 8, the output signal of which is supplied to difference-forming means 10, which also receives a reference signal from reference voltage source 11. The error signal is supplied to regulator 12. In the same way as shown in FIG. 1b, photodetector 7 may be electronically matched to other detectors 46 and 47. The part of the light from light source 4, which is not switched to optical fiber 50, is further conducted through optical fiber 14 to interference filter 37, which reflects back the major part of the light from light source 4, and at the same time transmits part of the radiation which emanates from the measured object, for example a steel furnace or steel ladle, via optic units 38 and 39. The radiation from the measured object, which is a measure of its temperature, thus passes into optical fiber 14 together with the light reflected by filter 37, and is switched in optical branch 40 into optical fiber 16 and then in optical branch 41 into optical fibers 42 and 43. Between the end surface of optical fiber 42 and photodetector 47 there is filter 44 which only lets through the light from light source 4, and between the end surface of optical fiber 43 and photodetector 46 there is filter 45 which only passes the radiation from the measured object that has passed through filter 37. This results in the formation of a signal, after detection by detector amplifier 48 and extraction of the square root by function forming means 21, proportional to the attenuation in the fiber optics. After the quotient formation in quotient-forming means 23, a measuring signal which is compensated for the fiber optics is received by indicating instrument 24, for temperature read-out. In the same way as is shown in FIG. 1b, the circuits 29–36 provide compensation for deviations in the matching between photodetectors 46 and 47.

Instead of using optical branch 41 and two optical fibers 42 and 43, photodetectors 46 and 47 along with filters 44 and 45 may be mounted adjacent to each other in front of the end surface of optical fiber 16 (not shown in FIG. 2).

Figure 3A:
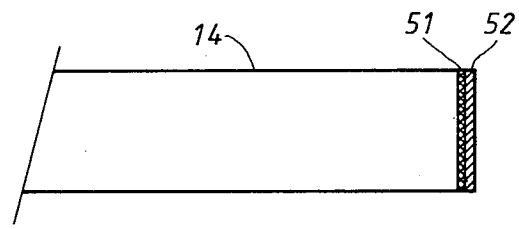
FIGS. 3a to 3d show respective modifications of the transducer unit.
Figure 3B:
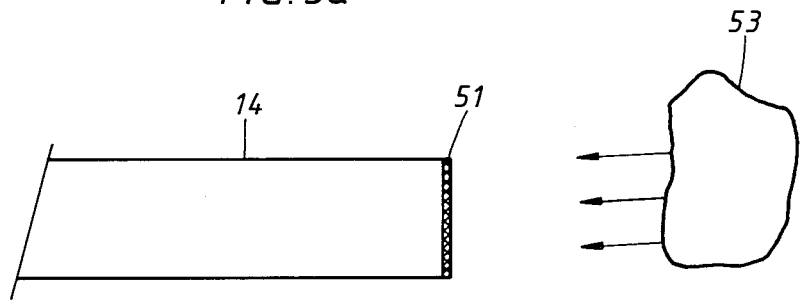

FIGS. 3a, 3b, 3c and 3d each show respectively different exemplary arrangements of elements that are the counterpart of transducer 15, which may occur in the measuring devices described, supra, with reference to FIGS. 1 and 2. In FIG. 3a the radiation is obtained from black body layer 52, which has been applied on filter 51 which filters the reference beam from light source 4 (see FIGS. 1 and 2) and transmits the unfiltered parts of the radiation to layer 52 which reflects radiation back through filter 51 and into optical fiber 14. Filter 51, which may be a multi-layer interference filter vaporized on the end surface of optical fiber 14, may be omitted, the reference beam then being reflected at the boundary surface between optical fiber and black body radiating object 52. FIG. 3b shows a variation of FIG. 3a, and in this case radiating object 53 is not in contact with the end surface of optical fiber 14.

Figure 3C:
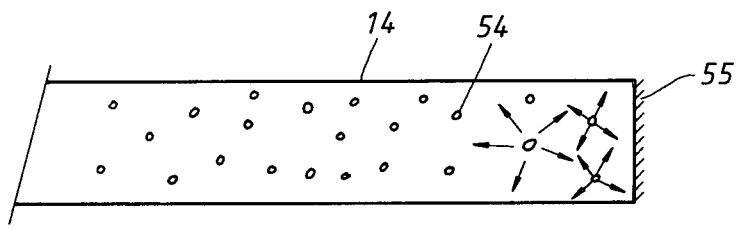

In FIG. 3c radiating objects 54 are located inside optical fiber 14, the measuring temperature thus being the same as the optical fiber temperature. The radiating object may consist of small grains 54 inside optical fiber 14, or the radiation from the optical fiber may in itself constitute the measuring signal. The end surface of optical fiber 14 may either be coated with a reflecting layer, be terminated directly against the surrounding air, or against an index-matching non-reflecting surface. In the latter case, grains 54 are utilized for reflection of the reference light from light source 4.

Figure 3D:
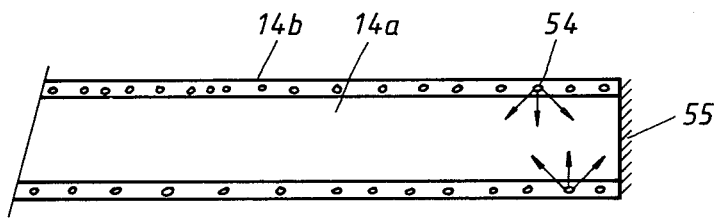

Finally, FIG. 3d shows a modification where radiating object 54 is located in sheath 14b of optical fiber 14a.

The devices according to the above may be varied in many ways within the scope of the following claims as is readily apparent to one of ordinary skill in the art.

What is claimed is:

1. Fiber optical measuring device for measuring the temperature of a temperature sensitive object, comprising:

means for radiating light;

a transducer reflecting light from said means for radiating light and including said temperature sensitive object emitting temperature induced radiation, said reflected light and said emitted radiation respectively representing a reference signal and a measuring signal and forming a composite signal;

detector means for detecting said composite signal and providing a composite output signal;

separating means responsive to said composite output signal for separating said reference signal and said measuring signal to produce an electrical reference signal and an electrical measuring signal, respectively;

at least one optical fiber for interconnecting said means for radiating light and said transducer, and for interconnecting said detector means and said transducer to transmit said composite signal;

means for combining said electrical reference and said electrical measuring signal to provide an output signal representative of the temperature of said temperature sensitive object compensated for instabilities in said transducer, detector means, separating means, and said at least one optical fiber; and wherein said means for combining further includes circuit means responsive to said electrical reference signal for generating another output signal representative of the square root thereof, and said another output signal and said electrical measuring signal are combined to produce said output signal.

2. A measuring device as in claim 1 wherein said means for radiating light includes at least one light source, and means for modulating said light source with at least one modulation frequency not included within said temperature induced radiation, and said separating means further includes a first filter for filtering said composite output signal to obtain said electrical measuring signal and a second filter for filtering said composite output signal to obtain said electrical reference signal.

3. A measuring device as in claim 1 wherein said detector means includes two detectors and further comprising an optical filter for filtering said composite signal impinging on each of said two detectors.

4. A measuring device as in claim 1 wherein said means for combining further includes quotient-forming means for forming the quotient between said another output signal and said electrical measuring signal.

5. A measuring device as in claim 1 further comprising means for generating another reference signal, means for comparing said another reference signal with said electrical reference signal to generate a comparison output signal, a controllable amplifier responsive to said composite output signal, and means for regulating said amplifier in response to said comparison output signal.

6. A measuring device as in claim 1 further comprising photodetector means for detecting at least a portion of the light from said means for radiating light, means for generating another reference signal, means for comparing said another reference signal with the output of said photodetector means to generate a control signal, and amplifier means responsive to said control signal for maintaining constant the light output from said means for radiating light.

7. A measuring device as in claim 1 wherein said detector means includes two detectors and further comprising at least one light source for radiating light to said two detectors, a controllable amplifier responsive to the output signal from one of said two detectors, means for comparing the output of said amplifier with the output of the other of said two detectors, the output of said other of said two detectors being representative of said reference signal, said amplifier being controlled in response to the output of said comparison means such that the output of said amplifier is representative of said measuring signal.

8. A measuring device as in claim 1 wherein said transducer includes an optical filter for at least partially reflecting the reference signal transmitted by said at least one optical fiber from said means for radiating light and for transmitting at least a part of the measuring signal dependent upon said temperature induced radiation from said object.

9. A measuring device as in claim 1 wherein the end of said at least one optical fiber at said transducer includes black body radiation means.

10. A measuring device as in claim 9 wherein said optical fiber end further includes a multi-layer interference filter overlaying said black body radiation means.

11. A measuring device as in claim 1 wherein said at least one optical fiber includes an end portion having a sheath including means dispersed therein for generating black body radiation.

12. A measuring device as in claim 1 wherein said at least one optical fiber includes an end portion at said transducer having dispersed therein black-body radiating grains.

13. Fiber optical measuring device as in claim 1 further comprising other detector means, other means for radiating light to impinge upon said detector means and said other detector means, and compensating means responsive to the respective outputs of said detector means and said other detector means to generate a control signal to compensate for deviations in matching between said detector means and said other detector means.

14. Fiber optical measuring device as in claim 13 further comprising a controllable amplifier responsive to the output of said other detector means, and said compensating means includes feedback compensation means responsive to the output of said controllable amplifier and said detector means to generate said control signal for controlling said controllable amplifier, and wherein said detector means and said other detector means each include photodetector means and said control signal compensates for deviations in matching therebetween.

15. Fiber optical measuring device as in claim 14 further comprising first means for modulating said means for radiating light with a modulation frequency not included within said temperature induced radiation and second means for modulating said other means for radiating light with a second modulation frequency, and wherein said feedback compensation means includes a difference forming means for determining the difference between the output of said controllable amplifier and said detector means, to provide a difference signal, a filter for filtering said difference signal with respect to said second modulation frequency, and demodulator-regulator means responsive to the output of said filter for generating said control signal.

* * * * *